United States Patent [19]

Blackwell et al.

[11] Patent Number: 5,481,058
[45] Date of Patent: Jan. 2, 1996

US005481058A

[54] SUPERCRITICAL FLUID EXTRACTION INVOLVING HYDROFLUOROALKANES

[75] Inventors: John A. Blackwell, Oakdale; Daniel T. Chen, St. Paul; Todd D. Alband, Eagan; Craig A. Perman, Woodbury, all of Minn.

[73] Assignee: Minnesota Mining and Manufacturing Company, St. Paul, Minn.

[21] Appl. No.: 178,935

[22] Filed: Jan. 7, 1994

[51] Int. Cl.$^6$ .................................................. C07C 7/00
[52] U.S. Cl. .......................... 585/833; 585/864; 208/952
[58] Field of Search ................................... 585/833, 842, 585/864; 208/952

[56] References Cited

U.S. PATENT DOCUMENTS 4,749,522  6/1988  Kamarei ............................. 554/8

FOREIGN PATENT DOCUMENTS 3323940  1/1985  Germany.
84/02291  6/1984  WIPO.
93/12161  6/1993  WIPO.

OTHER PUBLICATIONS

*Polymer International*, 27, 157–164 (1992).
*Journal of Chemical Engineering of Japan*, vol. 18, No. 5, 455–460 (1985).
*Anal. Chem.*, 59, 1705–1708 (1987).
Process Technology Proceedings, 3, "Supercritical Fluid Technology", J. M. L. Penninger et al., eds., 218–221 (1985).
*Proc. Int. Symp. on Supercritical Fluids*, 365–372 (1988).
*Journal of Chromatography*, 363, 397–401 (1986).
*Journal of Chromatographic Science*, vol. 24, 258–264 (Jun. 1986).
*Anal. Chem.*, 59, 640–644 (1987).
*J. Org. Chem.*, 49, 5097–5101 (1984).
*J. Chem. Thermodynamics*, 24, 413–424 (1992).
*J. Chem. Thermodynamics*, 25, 277–292 (1993).
*J. Chem. Thermodynamics*, 23, 1063–1068 (1991).
*J. Chem. Eng. Data*, 38, 116–118 (1993).
The 5th International Symposium on Supercritical Fluid Chromatography and Extraction, Jan. 11–14, 1994, Baltimore, Md. Preliminary Program.

*Primary Examiner*—P. Achutamurthy
*Attorney, Agent, or Firm*—Gary L. Griswold; Walter N. Kirn; Robert H. Brink

[57] ABSTRACT

A process for separating a first component of a composition from a second component of a composition. The process involves contacting the composition with a supercritical fluid comprising 1,1,1,2-tetrafluoroethane or 1,1,1,2,3,3,3-heptafluoropropane, or a mixture thereof, in the supercritical state under conditions and for a time sufficient to remove the first component from the composition.

20 Claims, No Drawings

5,481,058

SUPERCRITICAL FLUID EXTRACTION INVOLVING HYDROFLUOROALKANES

FIELD OF THE INVENTION

This invention relates to supercritical fluid extraction. In another aspect this invention relates to extraction of polymeric materials. In yet another aspect this invention relates to valve seals for use in connection with inhalers for delivering a metered dose of aerosolized medicament.

DESCRIPTION OF THE RELATED ART

In recent years there has been a broad interest in supercritical fluid extraction (see, e.g., Kirk-Othmer Encyclopedia of Chemical Technology, pages 872–893, supplement volume, third edition, 1984, John Wiley and Sons, New York). Materials that have found use as supercritical solvents include carbon dioxide, ammonia, water, methanol, ethanol, propyl alcohol, $C_1$–$C_6$ alkanes, and ethylene. Supercritical fluids have found myriad uses, including extracting oils, flavors, fragrances, and other materials from foods, tertiary oil recovery from petroleum reservoirs, petroleum fractionation and deasphalting, and deashing of coal.

It is well known that polymeric materials often contain toxic or otherwise undesirable components that do not contribute to their useful properties. For example, thermoset rubbers commonly contain, in addition to the thermoset polymers, residual monomers, solvents, plasticizers, vulcanizing agents, pigments, antioxidants, fillers, and other minor components. In many industrial applications the presence of such minor components is of no consequence to the end use of the polymeric material. In applications such as packaging, however, certain minor components can be leached out of a polymeric packaging material to the detriment of the composition contained within the package. Furthermore in applications where a polymeric material is to contact food, the skin, or a pharmaceutical preparation, the presence of toxic or carcinogenic substances (e.g., polynuclear aromatic compounds, phthalates) is to be minimized and preferably avoided.

Minor components, impurities, and the like can sometimes be extracted from polymeric materials through the use of organic solvents. Organic solvents, however, generally dissolve a narrow range of solutes. They also diffuse relatively slowly into and out of extractable substrates, rendering process cycles unduly long and cleaning primarily at the surface of the substrate. Furthermore conventional extraction techniques involving liquid organic solvents afford a waste stream of solute-contaminated solvent that must be either recycled or disposed of. Due to these and other concerns supercritical fluid extraction has been used as a replacement for conventional solvent extraction processes for polymers.

SUMMARY OF THE INVENTION

It has been found that 1,1,1,2-tetrafluoroethane (HFC-134a) and 1,1,1,2,3,3,3-heptafluoropropane (HFC-227) in the supercritical state are suitable for use in supercritical fluid extraction. This invention therefore provides a process for separating a first component of a composition from a second component of a composition, which first component has a solubility differing from that of the second component in a supercritical fluid comprising a hydrofluoroalkane in the supercritical state and selected from the group consisting of 1,1,1,2-tetrafluoroethane and 1,1,1,2,3,3,3-heptafluoropropane, comprising the steps of:

(i) contacting the composition with the supercritical fluid under conditions and for a time sufficient to dissolve the first component and not the second component of the composition in the supercritical fluid to provide a supernatant supercritical fluid; and (ii) removing the supernatant supercritical fluid from contact with the composition.

This invention also provides a process for extracting impurities from a polymeric material, comprising the step of contacting said polymeric material with a supercritical fluid comprising a hydrofluoroalkane in the supercritical state and selected from the group consisting of 1,1,1,2-tetrafluoroethane, 1,1,1,2,3,3,3-heptafluoropropane, and a mixture thereof, under conditions and for a time sufficient to remove impurities from the polymeric material.

DETAILED DESCRIPTION OF THE INVENTION

As used in the instant specification and claims the term "impurity" refers to a component of a composition that is not desired in the composition. The term "solubility" as used herein refers to the tendency of a substance to be taken into dispersed mixture at the molecular or ionic level with a supercritical fluid. Likewise the term "dissolve" means to take into dispersed mixture at the molecular or ionic level with a supercritical fluid. The term "supernatant critical fluid" as used herein refers to a supercritical phase in a separation or extraction, which phase is a separate phase from that of the substrate upon which the extraction or separation is conducted and which contains a dissolved component or impurity from the substrate.

The process of the invention involves the use of a supercritical fluid comprising supercritical 1,1,1,2-tetrafluoroethane (HFC-134a) or supercritical 1,1,1,2,3,3,3-heptafluoropropane (HFC-227) as a means of separating the components of combinations or mixtures of materials. In order for components to be separable by the process of the invention one component must, however, have a solubility in the supercritical fluid that differs from that of the other component. Whether or not any particular components have suitably differing solubility to allow separation in the supercritical fluid can be readily determined by those skilled in the art.

The process of the invention can be carried out in any environment suitable for containing the supercritical fluid in contact with the material, composition, or article to be extracted or separated for a time sufficient to remove impurities or other components. The process can be either static (i.e., without flow of the supercritical fluid during the extraction process) or dynamic (i.e., with a supply of supercritical fluid flowing over the substrate during the extraction process). Operating parameters for a process of the invention are limited at one extreme by the minimum temperature and pressure required to obtain a supercritical phase. The critical temperature of HFC-134a is 101.2° C.; its critical pressure is 40.1 atm. The critical temperature of HFC-227 is 101.9° C.; its critical pressure is 29.1 atm. Mixtures of HFC-134a and HFC-227 will have critical temperatures and pressures different from those of the pure components due to non-ideal phase behavior. Operating parameters are limited at the other extreme by the capabilities of equipment utilized in the process and by the stability of the composition (or the components thereof) to contact with the supercritical fluid at elevated temperatures and/or pressures.

Suitable conditions (time of contact between the composition and the supercritical fluid, temperature, and pressure) for a particular extraction or separation can be readily selected by those skilled in the art, considering the constitution and, if applicable, the dimensions or quantity of the composition to be separated or extracted. It is well known that supercritical fluids exhibit increasing solvent power with increasing pressure (i.e., increasing fluid density). The solvent power of supercritical HFC-134a, supercritical HFC-227, or a mixture thereof, can be readily tailored to the particular extraction or separation by adjusting the temperature and pressure of the supercritical phase such that the component or components that are to be dissolved and removed from a composition are soluble and the other component or components of the composition remain undissolved. In order to optimize the range of solvent power that can be obtained in a process of the invention, it is preferred to operate at or near the critical temperature of the supercritical fluid and to adjust the pressure in order to obtain optimal fluid density for the extraction to be carried out. Those skilled in the art will recognize, however, that for a particular extraction or separation it will sometimes be necessary or desirable to operate at higher temperatures in order to increase the diffusion rate of the supercritical fluid and/or the component to be extracted or separated, or to increase the volatility of the component to be extracted or separated. In embodiments involving HFC-134a or HFC-227 alone as the supercritical fluid preferred temperatures are generally in the range of 101° C. to about 300° C.

The process of the invention optionally involves the further step of contacting the composition with supercritical carbon dioxide. This step can be carried out either before or after the step of contacting the composition with supercritical hydrofluoroalkane. Supercritical carbon dioxide extraction is well known to those skilled in the art and suitable conditions can be readily selected for use with a particular substrate.

Generally the process is carried out using a pressure vessel in combination with appropriate ancillary equipment for providing a supercritical fluid, controlling temperature and pressure of the supercritical fluid, and controlling the flow of the supercritical fluid into and out of the vessel. The composition, article, articles, or raw polymer (referred to generally as a "substrate") is placed in the pressure vessel. Optionally an adsorbent material (e.g., activated carbon, alumina, silica, zeolites) is placed in contact with the supercritical fluid. The adsorbent material can be placed in the pressure vessel, preferably in a container such as a nylon mesh bag that serves to sequester the adsorbent material from the substrate. Alternatively in a dynamic process, the adsorbent can be placed in contact with the supercritical fluid in any suitable portion of the process apparatus. The adsorbent material is selected in order to adsorb extracted components such as impurities from the supercritical fluid and to help drive the process to completion.

With the substrate and any optional adsorbent contained within the pressure vessel the supercritical fluid is pumped into the vessel and allowed to contact the substrate. Ancillary materials such as helium, carbon dioxide, nitrogen, methanol, water, and propylene carbonate can also be used in the process of the invention, for example, as polarity modifiers or as diluents to reduce the cost of the supercritical phase.

In a dynamic process the supercritical fluid is passed into the vessel, over and into contact with the substrate, and out of the vessel for a time and in a quantity sufficient to remove the desired component (e.g., a class of impurities) from the substrate. In a static process the vessel is charged with the hydrofluoroalkane in an amount selected in order to provide a preselected supercritical pressure within the vessel and heated to a selected supercritical temperature. The supercritical fluid is allowed to remain in contact with the substrate for a time sufficient to remove the desired component from the substrate. The vessel is then purged of supercritical fluid, albeit slowly as rapid purging can cause blistering of some substrates. With either a static or dynamic process, the fluid cools and expands as it passes from the pressure vessel. If desired the effluent can be passed into a trap where the extracted or separated components are precipitated or otherwise isolated. The resulting gaseous material is either vented or recycled.

If an optional supercritical carbon dioxide extraction is used after the hydrofluoroalkane process the pressure vessel is resealed, taken to a preselected extraction temperature, and charged with carbon dioxide at a preselected extraction pressure. Upon completion of the extraction period the vessel is vented as described above.

The process of the invention can be used in supercritical fluid extraction, polymer fractionation, and other separations in which supercritical fluids are employed. A particularly preferred embodiment of the invention involves extraction of impurities from polymeric materials. Polymeric materials that can be extracted include: elastomeric materials, e.g., thermoset rubbers such as natural rubbers, nitrile rubbers, butyl rubbers, neoprene rubbers, ethylene-propylene rubbers, silicones, and ethylene-propylene-diene (EPDM) rubbers; latex rubbers; thermoplastic elastomeric materials, such as styrene-ethylene/butylene-styrene copolymers and styrene-butylene-styrene copolymers; and plastics such as polyethylenes, styrenes, phenolics, urea-formaldehyde resins, acrylics, cellulosics, polyamides, vinyl polymers, polypropylene, polyesters, maleimide-formaldehyde resins, alkyds, epoxies, and polyurethanes. Common impurities in polymeric materials include, depending on the particular polymeric material, residual monomers, solvents, plasticizers, vulcanizing agents, pigments, antioxidants, fillers, mold release agents, surfactants, stabilizers, proteins, and sugars.

A polymeric material to be extracted can be in the form of a raw polymer (e.g., beads, pellets, or the like) or in the form of a finished article. The process of the invention has been found to have particular utility as a means for extracting impurities from gaskets, O-rings, and diaphragm seals, especially those comprising thermoset rubbers such as nitrile rubbers, butyl rubbers, neoprene, and the like. Such articles are commonly used in myriad applications including in connection with metered dose inhalers used in treating respiratory conditions such as asthma.

In embodiments of the invention involving extraction of impurities from thermoset elastomeric articles, it is preferred to operate at temperatures of about 101° C. to about 150° C. and at pressures of about 100 atm to about 400 atm, where the rubber is stable to the extraction conditions yet common extractable impurities are soluble in the supercritical phase.

Polynuclear aromatic compounds ("PNAs"), some of which are known carcinogens and/or teratogens) are among the impurities present in thermoset rubbers. Gaskets and seals comprising thermoset rubbers are commonly used in metered does inhalers containing medicinal aerosol formulations. Much current aerosol formulation development involves HFC-134a and HFC-227 as propellants. These propellants when contacted with the thermoset rubber components of the valve and the container closure system interact with the rubbers and slowly extract PNAs (if present) and other extractable materials into the formulation. The Examples below demonstrate the utility of the process of the invention in removing PNAs and other extractable materials from a thermoset rubber.

The general methods below were used in the Examples that follow.

SUPERCRITICAL FLUID EXTRACTION

A pressure vessel is charged with a quantity of rubber parts and sealed. The vessel is chilled to about −40° C. and the hydrofluoroalkane is condensed into the pressure vessel until a sufficient quantity as determined by weight is transferred to obtain the predetermined extraction pressure at the predetermined supercritical extraction temperature. A manual pressure letdown valve is connected to the vessel along with a pressure transducer. The vessel is transferred to a heating bath and heated at the extraction temperature for a predetermined extraction period. There is no fluid flow during the extraction period. Upon completion of the extraction period the pressure vessel is vented to atmospheric pressure over a time period of about 3–4 hours. The rubber parts are recovered from the pressure vessel.

If activated carbon is used as an adsorbent material in the extraction process it is placed in a mesh bag and the bag is placed in the pressure vessel along with the rubber parts.

In those processes where the supercritical hydrofluoroalkane extraction is followed by a supercritical carbon dioxide extraction, the hydrofluoroalkane is vented as described above and the pressure vessel is resealed. A gas compressor is used to charge the pressure vessel with carbon dioxide to a predetermined extraction pressure. The pressure vessel is allowed to stand at the extraction temperature for the duration of a predetermined extraction period. Upon completion of the extraction period the pressure vessel is vented to atmospheric pressure over a time period of about 3–4 hours. The rubber parts are recovered from the pressure vessel.

Rubber parts were analyzed for weight percent extractable materials according to the methods that follow:

TRICHLOROFLUOROMETHANE EXTRACTABLES

A sample of approximately 5 grams of rubber parts is weighed accurately into a 120 mL (4 ounce) glass extraction vial. Propellant 11 (trichlorofluoromethane, 20 mL) is added to the vial and the vial is fitted with a screw cap having an inert liner. The filled extraction vial is shaken for 16 hours at room temperature, after which the propellant is decanted into a tared predried vial. The extraction vial is rinsed with P-11 and the rinse added to the tared predried vial. The propellant is evaporated under a dry nitrogen purge. The vial containing the dried residue is dried at 105° C. for one hour, cooled to room temperature, and weighed. Percent extractables is calculated from the weight of the residue and the initial weight of the rubber parts. The result given is the average of 2 independent determinations.

P-134a EXTRACTABLES

A sample of approximately 5 grams of rubber parts is weighed accurately into a 120 mL (4 ounce) PVC coated glass pressure vial. Exactly 3.0 mL of absolute ethanol is added to the pressure vial and the vial is fitted with a continuous flow valve having a gasket make of FLEX-OMER DFDB-1085 resin (Union Carbide). The sealed vial is then pressure filled with 17 mL HFC-134a. The filled vial is stored at 40° C. for 7 days, after which the propellant is sprayed through an ACRODISC™ PTFE filter (0.45 μm) into a tared predried vial. Residual propellant is evaporated under a dry nitrogen purge. The vial containing the dried residue is dried at 105° C. for one hour, cooled to room temperature, and weighed. Percent extractables is calculated from the weight of the residue and the initial weight of the rubber parts. The result given is the average of 2 independent determinations.

POLYNUCLEAR AROMATIC HYDROCARBONS

Rubber parts of a particular lot that have not been subjected to extraction using a process of the invention (untreated rubber parts) are extracted with trichlorofluoromethane over a 16 hour period as described above. The extract is dried and reconstituted in a diluent. Individual PNAs are separated by gradient HPLC (Supelco LC-PAH column, 15 cm×4.6 cm, 5 um particle size; 1 mL/min flow rate; mobile phase gradient of 50% aqueous acetonitrile for 3 minutes, constant rate of mixture change to 90% aqueous acetonitrile over 10 minutes, and hold until last peak is eluted). The PNA peaks are identified and quantitated by comparison to a quantitative standard mixture containing 16 PNAs as follows:

naphthalene
acenaphthylene
acenaphthene
fluorene
phenanthrene
anthracene
fluoranthene
pyrene
benzo(a)anthracene
chrysene
benzo(b)fluoranthene
benzo(k)fluoranthene
benzo(a)pyrene
dibenzo(a,h)anthracene
benzo(ghi)perylene
indeno(1,2,3-cd)pyrene The PNA peaks from the extract are individually quantitated and the pyrene concentration is noted.

Rubber parts of the same lot as used above that have been extracted using a process of the invention (treated rubber parts) are extracted and the extracts analyzed in the same manner as those from the untreated rubber. The PNA peaks from the extract are individually quantitated and the pyrene concentration is noted.

The percent of PNA remaining after extraction is calculated from the total PNA in the untreated rubber and the total PNA in the treated rubber. The result given is the average of 2 independent determinations.

Rubber diaphragms having an outside diameter of about 8.48 mm (0.334 inch), an inside diameter of about 2.46 mm (0.097 inch), and a thickness of about 0.965 mm (0.038 inch), made of a nitrile rubber (DB-218, American Gasket and Rubber, Schiller Park, Ill.) were used as the rubber parts except as otherwise indicated. The rubber parts were extracted with supercritical fluid hydrofluoroalkane according to the general method above using the fluids and other conditions enumerated in the Table below. Supercritical fluid extractions were done at 125° C. unless otherwise indicated. The diaphragms were then analyzed according to the test methods set forth above. Control diaphragms, not subject to supercritical fluid extraction, were also analyzed.

TABLE 1

| Example | P(atm) | t(h) | Fluid | Weight % P-11 Extractables | Weight % P-134a Extractables | PNA Content (% of Control) |
|---|---|---|---|---|---|---|
| Control | — | — | — | 2.36 | 1.18 | 100 |
| 1 | 80 | 24 | P-134a | 1.63 | 1.04 | 102.2 |
| 2 | 320 | 24 | P-134a | 1.21 | 0.66 | 84.2 |
| 3* | 340 | 24 | P-134a | 0.22 | 0.14 | 0.7 |
| 4* | 218 | 72 | P-134a | n.d.[B] | 0.13 | n.d.[B] |
| 5*c | 272 | 48 | P-134a | 0.18 | 0.14 | <0.1 |
| 6* | 340 | 48 | P-134a | n.d.[B] | 0.13 | 0.2 |
| 7* | 221 | 120 | P-227 | 0.19 | 0.13 | <0.5 |
| 8* | 170 | 48 | P-227 | 0.27 | 0.18 | 0.6 |
| 9[A] | 313 | 24 | P-134a | 0.17 | 0.07 | 0.2 |
|  | 340 | 24 | $CO_2$ |  |  |  |

*Pressure vessel contained activated carbon (NUCHAR ™ BX7540, Westvaco)
[A]P-134a extraction followed by $CO_2$ extraction. $CO_2$ extraction carried out at 50° C.
[B]n.d. indicates not determined
[C]Extraction carried out on tank seals having inside diameter of 1.83 mm (0.072 inch), outside diameter of 3.76 mm (0.148 inch), and thickness of 1.27 mm (0.050 inch).

The results in the Table show that in all instances the exemplified process of the invention reduced the quantity of extractable material in the nitrile rubber as measured by at least one of the test methods compared to control. The results also show that the use of an activated carbon adsorbent in the process improves removal of extractable materials.

What is claimed is:

1. A process for separating a first component of a composition from a second component of a composition, which first component has a solubility differing from that of the second component in a supercritical fluid comprising a hydrofluoroalkane in the supercritical state and selected from the group consisting of 1,1,1,2-tetrafluoroethane and 1,1,1,2,3,3,3-heptafluoropropane, comprising the steps of:

(i) contacting the composition with the supercritical fluid under conditions and for a time sufficient to dissolve the first component and not the second component of the composition in the supercritical fluid to provide a supernatant supercritical fluid; and (ii) removing the supernatant supercritical fluid from contact with the composition.

2. A process according to claim 1 wherein the composition comprises a polymeric material.

3. A process according to claim 2 wherein the first component comprises an impurity in the composition.

4. A process according to claim 3, wherein the impurity comprises a polynuclear aromatic hydrocarbon.

5. A process according to claim 2, wherein the composition comprises a thermoset rubber.

6. A process according to claim 5, wherein the thermoset rubber is selected from the group consisting of natural rubbers, nitrile rubbers, butyl rubbers, neoprene rubbers, ethylene-propylene rubbers, silicones, and ethylene-propylene-diene rubbers.

7. A process according to claim 1, wherein the supercritical fluid comprises 1,1,1,2-tetrafluoroethane.

8. A process according to claim 1, wherein the supercritical fluid comprises 1,1,1,2,3,3,3-heptafluoropropane.

9. A process according to claim 1, wherein the supercritical fluid comprises both 1,1,1,2-tetrafluoroethane and 1,1,1,2,3,3,3-heptafluoropropane.

10. A process according to claim 1, wherein the supernatant critical fluid is contacted with an adsorbent material.

11. A process according to claim 1, further comprising the step of contacting the composition with supercritical carbon dioxide.

12. A process for extracting an impurity from a polymeric material, comprising the step of contacting said polymeric material with a supercritical fluid comprising a hydrofluoroalkane in the supercritical state and selected from the group consisting of 1,1,1,2-tetrafluoroethane, 1,1,1,2,3,3,3-heptafluoropropane, and a mixture thereof, under conditions and for a time sufficient to remove impurities from the polymeric material.

13. A process according to claim 12, wherein the impurity comprises a polynuclear aromatic hydrocarbon.

14. A process according to claim 12, wherein the polymeric material comprises a thermoset rubber.

15. A process according to claim 14, wherein the thermoset rubber is selected from the group consisting of natural rubbers, nitrile rubbers, butyl rubbers, neoprene rubbers, ethylene-propylene rubbers, silicones, and ethylene-propylene-diene rubbers.

16. A process according to claim 12, wherein the supercritical fluid comprises 1,1,1,2-tetrafluoroethane.

17. A process according to claim 12, wherein the supercritical fluid comprises 1,1,1,2,3,3,3-heptafluoropropane.

18. A process according to claim 12, wherein the supercritical fluid comprises both 1,1,1,2-tetrafluoroethane and 1,1,1,2,3,3,3-heptafluoropropane.

19. A process for extracting polynuclear aromatic hydrocarbons from a thermoset elastomeric seal, comprising the steps of: (i) contacting the seal with a supercritical fluid comprising a hydrofluoroalkane in the supercritical state and selected from the group consisting of 1,1,1,2-tetrafluoroethane and 1,1,1,2,3,3,3-heptafluoropropane, at a temperature in the range of 101° C. to about 150° C. and at a pressure in the range of about 100 to about 400 atmospheres for a time sufficient to remove polynuclear aromatic hydrocarbons from the thermoset elastomeric seal.

20. A process according to claim 19, wherein the thermoset elastomeric seal is a nitrile rubber.

* * * * *